United States Patent
Patino et al.

(10) Patent No.: US 7,268,799 B2
(45) Date of Patent: Sep. 11, 2007

(54) MULTI-FUNCTION DEVICE ILLUMINATION CONTROL SYSTEM AND METHOD

(75) Inventors: Joseph Patino, Pembroke Pines, FL (US); Randall S. Fraser, Plantation, FL (US); Alexander Rodriguez, Pembroke Pines, FL (US)

(73) Assignee: Motorola, Inc., Schaumburg, IL (US)

( * ) Notice: Subject to any disclaimer, the term of this patent is extended or adjusted under 35 U.S.C. 154(b) by 267 days.

(21) Appl. No.: 11/003,239

(22) Filed: Dec. 3, 2004

(65) Prior Publication Data
US 2006/0135224 A1 Jun. 22, 2006

(51) Int. Cl.
*H04N 7/14* (2006.01)
(52) U.S. Cl. .............. 348/14.01; 348/14.02; 348/236; 455/575.3
(58) Field of Classification Search .. 348/14.01–14.09, 348/333.01, 333.06, 333.12, 362, 363, 364, 348/365, 366, 236; 455/575.3; 345/62
See application file for complete search history.

(56) References Cited

U.S. PATENT DOCUMENTS

2002/0163524 A1* 11/2002 Dutta .................... 345/589
2004/0166829 A1* 8/2004 Nakae et al. ............ 455/403
2005/0041139 A1* 2/2005 Lowles .................. 348/362

FOREIGN PATENT DOCUMENTS

JP 2003-333141 * 11/2003

OTHER PUBLICATIONS

U.S. Appl. No. 10/396,039, filed Mar. 25, 2003, Estes et al.

* cited by examiner

*Primary Examiner*—Melur Ramakrishnaiah

(57) ABSTRACT

Wireless communications devices, such as cellular telephones (100), include an integrated camera (202) and process image data captured by that camera (202) to determine desired device illumination levels. A controller (410) within the wireless communications device (100) causes an image to be captured by the integrated camera (202). The captured image data is processed to determine approximate ambient light levels. A level of device illumination, such as provided by a display backlight (416) and a keypad backlight (418) is controlled based upon the approximate ambient light levels.

20 Claims, 5 Drawing Sheets

MULTI-FUNCTION DEVICE ILLUMINATION CONTROL SYSTEM AND METHOD

FIELD OF THE INVENTION

The present invention generally relates to the field of controlling device illumination, and more particularly relates to controlling illumination of controls of multiple-function devices.

BACKGROUND OF THE INVENTION

Many portable electronic devices, such as cellular phones, have illuminated components, including displays and keypads. These portable electronic devices sometimes include a photodetector that estimates relative ambient light levels in order to enable display backlighting in dark ambient light conditions. Adding this photodetector to the electronic device increases the cost and required size of the electronic device.

One type of portable electronic device that incorporates illuminated components is the flip-type cellular phone. Photodetectors used to determine the illumination state for the illuminated components are frequently located on the devices so that the photodetector is covered when the flip portion of the phone is closed. This causes such cellular phones with a photodetector to be unable to determine ambient light conditions with the flip closed.

Therefore, a need exists to overcome the shortcomings of the prior art as described above.

SUMMARY OF THE INVENTION

Briefly, in accordance with the present invention, a wireless communications device has at least one controllable illuminated component, at least one camera, and an ambient light level calculator that is communicatively coupled to the at least one camera. The ambient light level calculator receives at least one image from the camera and determines an approximate ambient light level based upon the at least one image. The device further contains an illumination controller that is communicatively coupled to the ambient light level calculator and to the at least one illuminated component. The illumination controller controls, in response to the approximate ambient light level, the at least one illuminated component.

Further in accordance with the present invention, a method for controlling an illumination level on a wireless communications device includes capturing at least one image with at least one camera mounted on an electronic device and determining an approximate ambient light level based upon the at least one image. The method further includes controlling, in response to the approximate ambient light level, an illumination level of at least one illuminated component that is located on the electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

Figure 1:
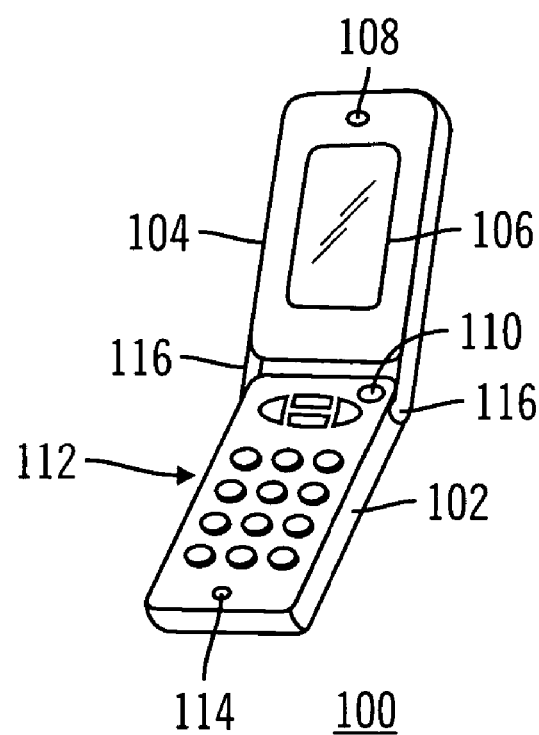
FIG. 1 illustrates a front view of a cellular flip-type phone according to an exemplary embodiment of the present invention in an open position.

FIG. 1 illustrates a front view of a cellular flip-type phone 100 according to an exemplary embodiment of the present invention in an open position. The open cellular flip-type phone 100 includes a phone base 102 and a flip part 104. The phone base 102 and flip part 104 include electronic circuits, as described below, that support wireless voice communications. The phone base 102 of this exemplary embodiment includes an illuminated keypad 112 to allow entry of phone numbers and other phone control information for the phone. The phone base 102 includes a microphone 114 to pickup sounds such as the user's voice. The phone base 102 further includes an alternate light sensor 110 that detects approximations of ambient light levels. The exemplary embodiment of the present invention processes image data from a camera, described in detail below, as well as from this alternate light sensor 110 to determine approximate ambient light levels in order to properly adjust the illumination level of either of or both of the keypad 112 and the display 106, which are illuminated components in the exemplary embodiment. Further embodiments alternatively place an alternate light sensor 110 on the flip part 104 of the cellular phone.

The flip part 104 is connected to the phone base 102 by hinge 116. The flip part 104 is shown in this illustration in an open position. The flip part 104 has an illuminated display 106 that is able to display alpha-numeric and graphical data in this exemplary embodiment that is either communicated over a wireless link or that is used to support control the operation of the cellular phone 100. The flip part 104 further includes a speaker 108 to produce audio signals and support audio and voice communications over a wireless link. The configuration of the speaker 108 and microphone 114 allow the open cellular flip-type phone 100 to be held along the face of the user to facilitate audio communications.

Figure 2:
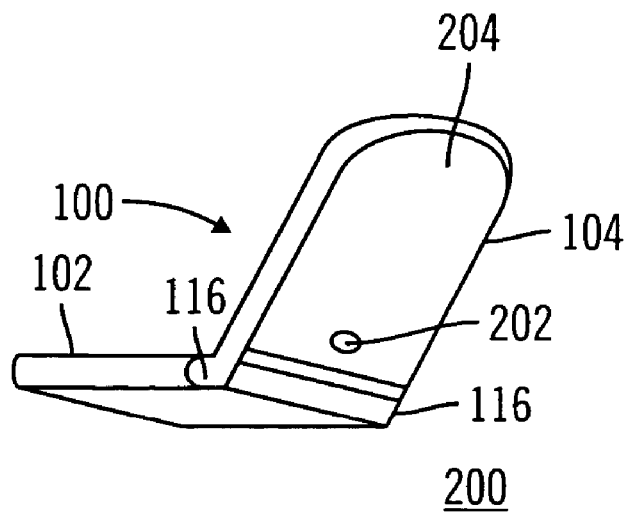
FIG. 2 illustrates a rear view of the cellular flip-type phone of FIG. 1 in an open position.

FIG. 2 illustrates a rear view 200 of the cellular flip-type phone of FIG. 1 in an open position. The rear view 200 illustrates the exemplary cellular phone 100 with the phone base 102, hinge 116, and flip part 104. This illustration shows the reverse side 204 of the flip part 104, which is the side opposite the side on which the display 106 is mounted. The reverse side 204 of the exemplary cellular phone 100 includes a camera 202 that allows two dimensional, color images to be captured by the exemplary cellular phone 100. Images captured by camera 202 are able to be, for example, viewed on display 106. The exemplary embodiment processes those images to determine approximate ambient light levels. The exemplary embodiment then adjusts the illumination levels of the keypad 112 and display 106 based upon the determined approximate ambient light levels.

Figure 3:
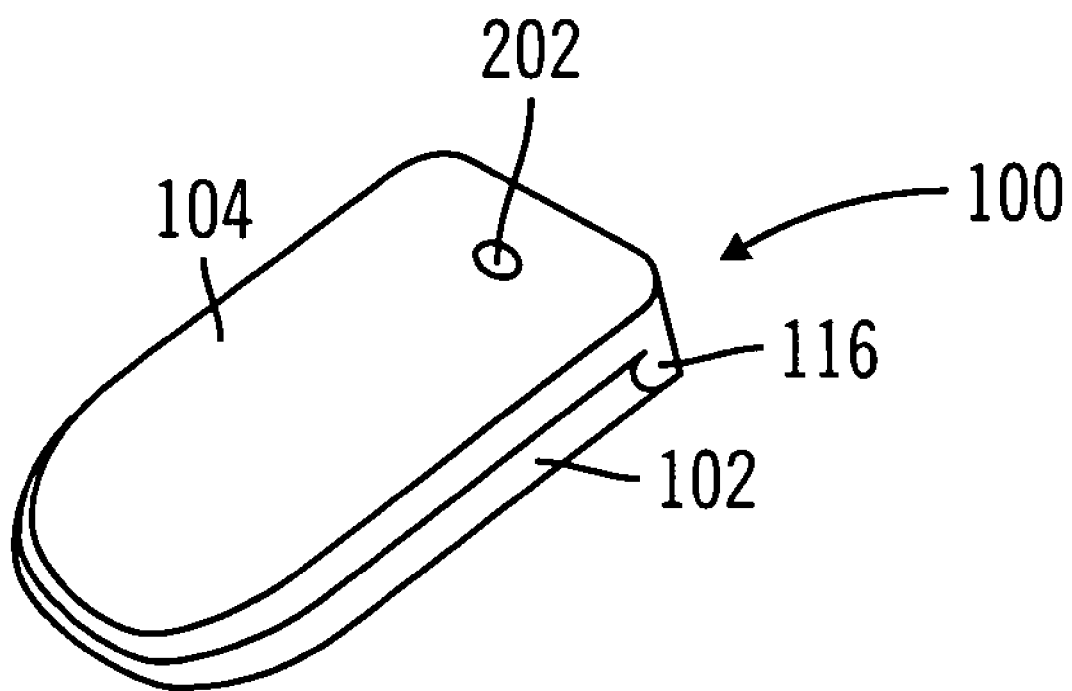
FIG. 3 illustrates the cellular flip-type phone of FIG. 1 in a closed position.

FIG. 3 illustrates the cellular flip-type phone of FIG. 1 in a closed position. The closed cellular flip-type phone shows that the flip part 104 has been repositioned, as compared to the open cellular flip-type phone, into a folded position with the flip part 104 placed adjacent to the phone base 102. In this embodiment, the flip part 104 is a first part and the phone base 102 is a second part of the flip-type cellular phone 100. As shown, the camera 202 is exposed to ambient light when the exemplary cellular phone 100 is in this folded position. Such positioning of the camera 202 allows the exemplary embodiment to determine the approximate ambient light level when in the folded position.

Figure 4:
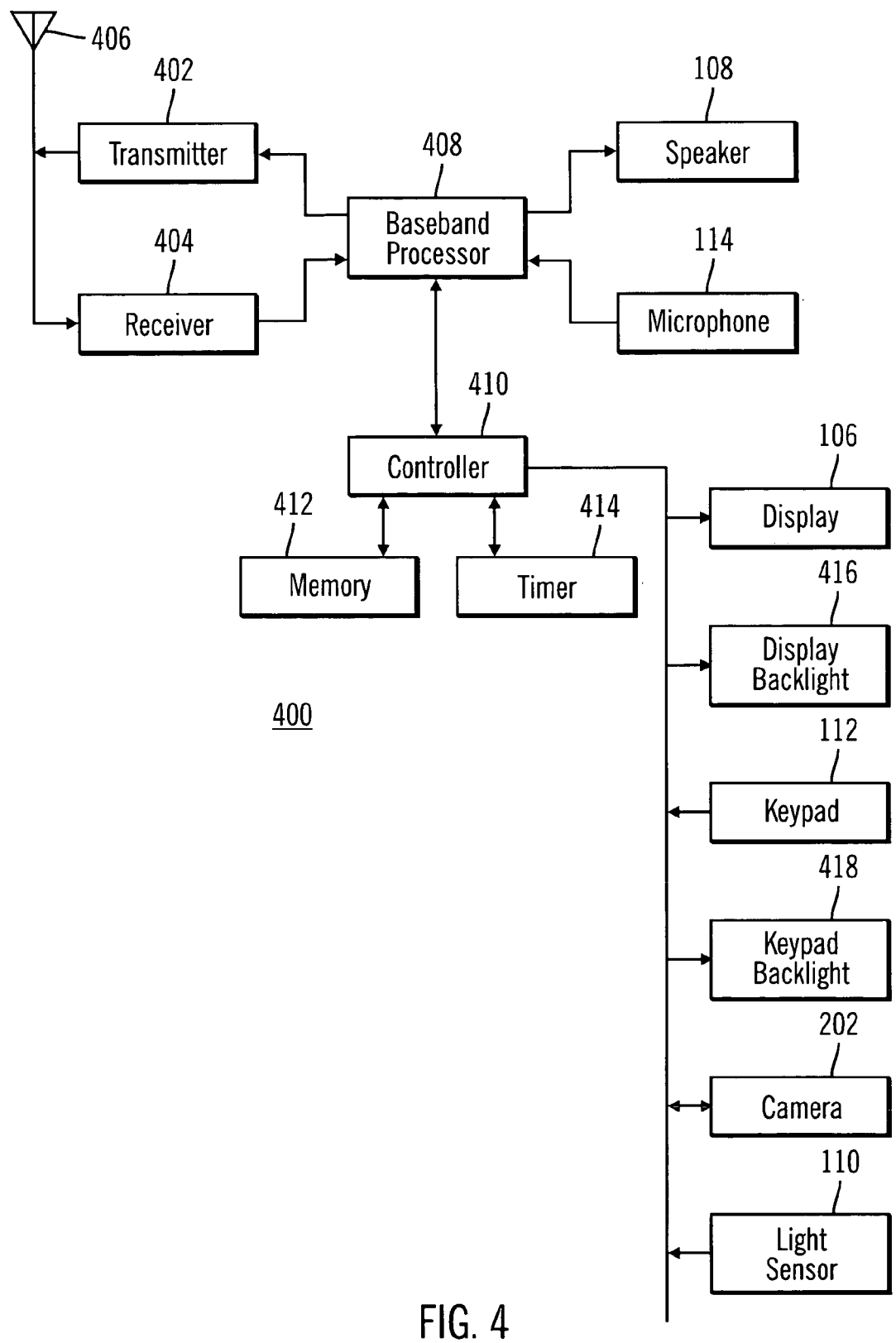
FIG. 4 illustrates a block diagram of a wireless device that incorporates an embodiment of the present invention.

FIG. 4 illustrates a block diagram of a wireless device 400 that incorporates an embodiment of the present invention. In this embodiment of the present invention, the wireless device 400 is a two-way radio capable of receiving and transmitting radio frequency signals over a communication channel under a communications protocol such as CDMA, FDMA, GPRS, TDMA, or GSM. The block diagram shows representative electronic circuits contained within the exemplary cellular flip-type phone 100.

The wireless device 400 includes an RF antenna 406, a RF receiver 404 and an RF transmitter 402. The RF transmitter 402 and RF receiver 404 are connected to the RF antenna 406 in order to support bi-directional RF communications. The wireless device 400 is able to simultaneously transmit and receive voice and/or data signals. The RF receiver 404 provides voice data to a baseband processor 408 and the baseband processor 408 provides voice data to the RF transmitter 402 to implement voice communications. The baseband processor 408 obtains voice signals from microphone 114 and provides audio signals to the speaker 108 for output to a user. The RF receiver 404, RF transmitter 402, baseband processor 408, microphone 114 and speaker 108 operate to communicate voice signals to and from the wireless device 400.

The wireless device 400 includes a controller 410 that controls the operation of the device in the exemplary embodiment. Controller 410 is connected to the various components of the wireless device 400 and communicates data to external devices (not shown), such as a cellular base station and/or a server, through a wireless link.

Controller 410 provides visual display data to the user through display 106. Display 106 of the exemplary embodiment is a Liquid Crystal Display that is able to display alphanumeric and graphical data. The display 106 of the exemplary embodiment includes a display backlight 416 that is able to generate backlighting of various intensities under the control of controller 410. Controller 410 also accepts user input from keypad 112. Keypad 112 is similar to a conventional cellular phone keypad and has buttons to accept user input in order to support operation of the exemplary embodiment of the present invention. Keypad 112 also has a keypad backlight 418 that is able to generate backlighting for the keypad 112 at various intensities under control of controller 410. An alternate light sensor 110, as described above, senses light intensity in the area of the wireless device 400 and provides sensed light level data to controller 410 to augment captured image data or to otherwise support determination of approximate ambient light levels.

The wireless device 400 further includes memory 412, which includes non-volatile memory that stores program data and more persistent data for use by the controller 410. Data stored in non-volatile memory of the exemplary embodiment can be changed under control of controller 410 if called for by particular processing performed by the controller 410. Memory 412 further contains volatile memory that is able to store transient data for use by the controller 410. For example, captured image data in the exemplary embodiment is stored in volatile memory within memory 412. Memory 412 is able to include Flash memory, other non-volatile memory, random access memory (RAM), dynamic random access memory (DRAM) or the like. A timer module 414 provides timing information to the controller 402 to keep track of timed events, such as periodic determination of approximate ambient light levels and adjustment of illumination intensities.

The controller 410 of the exemplary embodiment performs various functions such as the functions associated with setting the backlight levels for the display 106 and keypad 112 by controlling the display backlight 416 and the keypad backlight 418, respectively. The controller 410 of the exemplary embodiment includes an ambient light level calculator that receives at least one image from the camera 202 and determines an approximate ambient light level based upon processing of that at least one image. The controller 410 of the exemplary embodiment further includes an illumination controller that controls, in response to the approximate ambient light level, the at least one illuminated component. In various embodiments of the present invention, the controller 410 is one or more processors that perform the tasks described herein.

In one embodiment of the present invention, the exemplary cellular phone 100 comprises a smart phone, which is a combination of 1) a pocket PC, handheld PC, palm top PC, or Personal Digital Assistant (PDA) and 2) a mobile telephone. In this embodiment, the exemplary cellular phone 100 includes more than one controller 410—such as a separate baseband processor and application processor.

Figure 5:
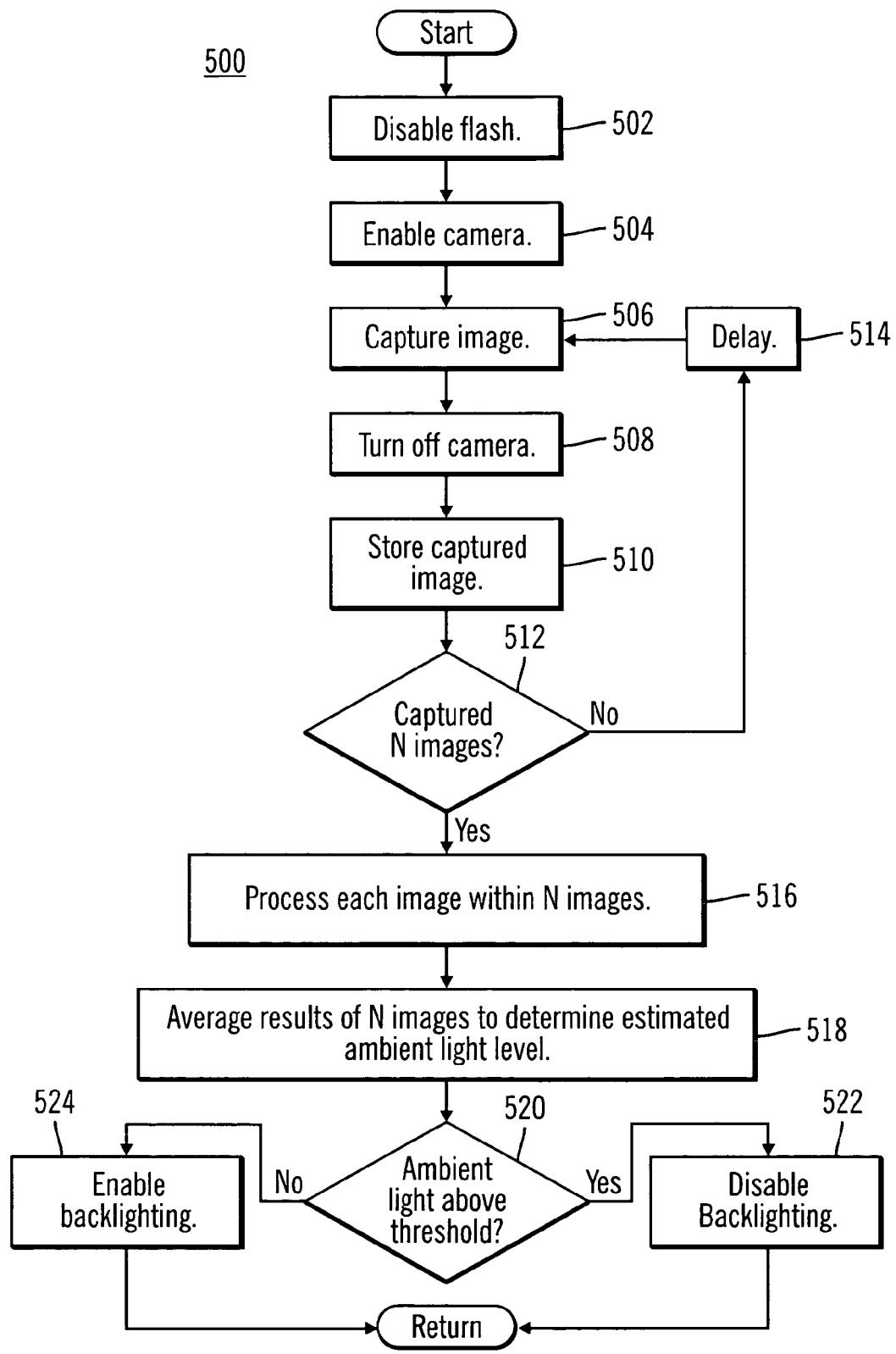
FIG. 5 illustrates an illumination control processing flow diagram in accordance with an exemplary embodiment of the present invention.

FIG. 5 illustrates an illumination control processing flow diagram 500 in accordance with an exemplary embodiment of the present invention. The processing flow for the exemplary embodiment begins by disabling, at step 502, the photographic flash for the device. The exemplary embodiment of the present invention includes a photographic flash illumination device to provide a flash of light during normal image capture processing to enhance illumination in low ambient light conditions. In this exemplary embodiment of the present invention, this flash is disabled and does not trigger when capturing an image as part of the illumination control processing flow 500. The processing then enables, at step 504, the camera 202. The processing proceeds to capturing, at step 506, an image with the camera. The processing then turns off, at step 508, the camera and the captured image is stored, at step 510. The processing then determines, at step 512, if N images have been captured. In the exemplary embodiment, N is initially set to three, but the processing of the exemplary embodiment allows N to be a dynamic number that is adjusted to compensate for variations in observed ambient light level over the N images. The number of images N that is to be captured for further processing is able to be varied in various embodiments of the present invention in order to improve the consistency of observed ambient light levels. For example, a user might place a hand over the camera when some of the images are captured, and thereby cause those images to report a greatly reduced ambient light level. In such a case, N is increased to achieve more consistent readings. Image consistency is determined in the exemplary embodiment by comparing the ambient light level indicated by each image to the average light level indicated by the N images. If there is a large variation, more images are captured. If N images have not been captured, the processing continues to a delay, at step 514. In the exemplary embodiment, a delay of 0.5 seconds is used. After this delay, the processing then captures, at step 506, an image and continues processing as described above. In the exemplary embodiment, capturing three images with 0.5 seconds between images provides an observation time of 1 second over which images are captured.

If N images have been captured, the processing advances to processing, at step 516, each image within the N images. The processing performed on each image is described in detail below. The processing then advances to averaging, at step 518, the results of the N images in order to determine the approximate ambient light level.

The processing then advances to determine, at step 520, if the approximate ambient light level is above a threshold. The threshold in the exemplary embodiment is selected as a function the backlight intensity and contrast of the display and/or keypad of the device. The threshold is selected so as to optimize the user experience. If the approximate ambient light level is determined to be above the threshold, the processing disables, at step 522, the device illumination. If the approximate ambient light is determined to not be above the threshold, the processing enables, at step 524, the device illumination. The processing then terminates.

Figure 6:
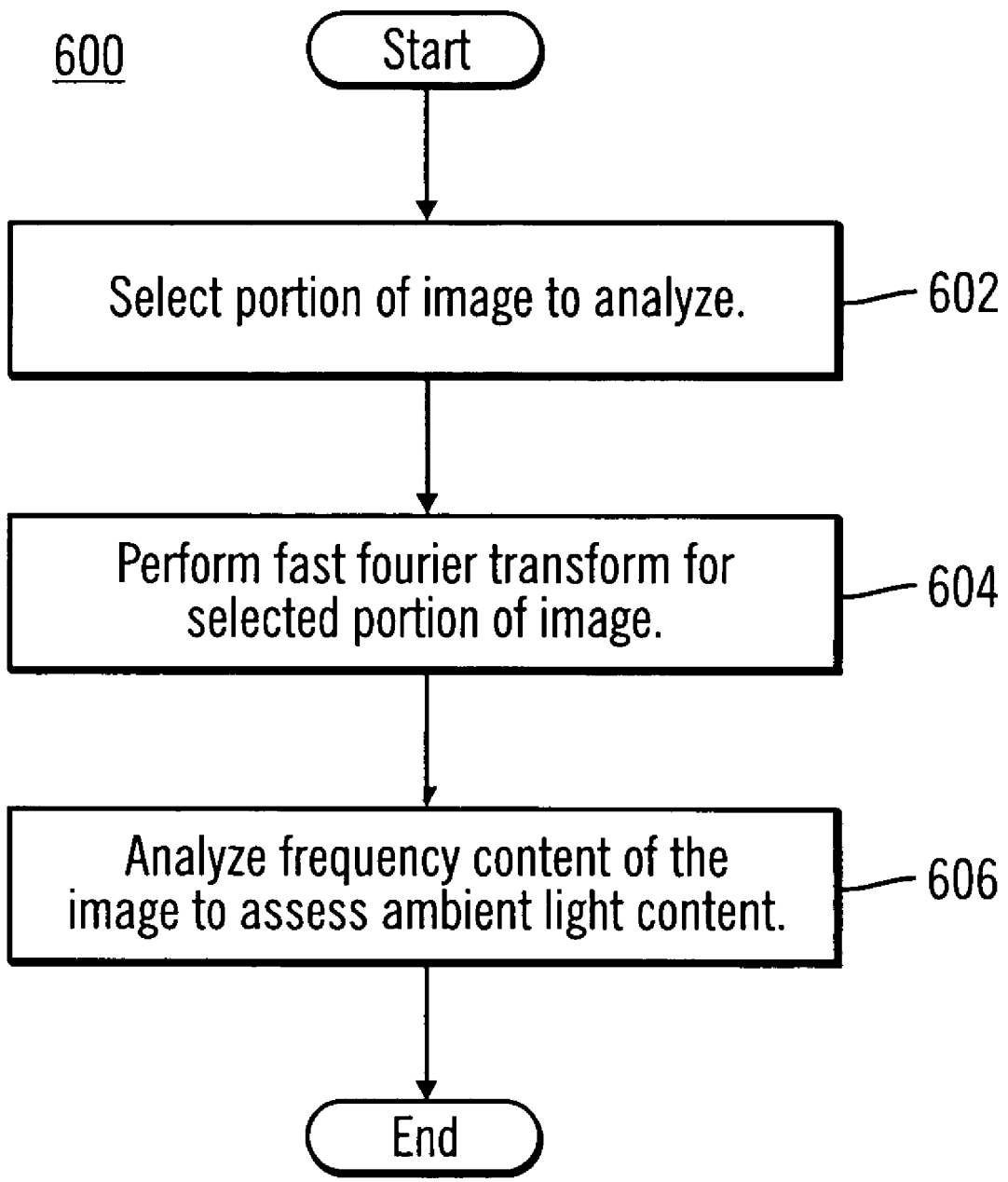
FIG. 6 illustrates an image processing flow performed by an exemplary embodiment of the present invention.

FIG. 6 illustrates an image processing flow 600 performed by an exemplary embodiment of the present invention. The image processing flow 600 begins by selecting a portion of the image to analyze. Various embodiments of the present invention analyze a preset pattern in the image, such as alternate pixels, or a random pattern of pixels. The processing of the exemplary embodiment continues by performing a two dimensional Fast Fourier Transform (FFT) on the selected portion of the image data. The processing then analyzes the frequency content of the image to assess ambient light content of the selected portion of the image. In the exemplary embodiment, a ten bin FFT is calculated and an average of all ten bins is used to calculate the ambient light level of that image.

Further embodiments of the present invention determine ambient light levels within an image in other ways, such as by averaging the pixel intensity values for selected pixels in the captured image. Various embodiments of the present invention select all pixels or a subset of pixels in the captured image to average to determine approximate ambient light levels. Some embodiments select a specific subset of pixels, such as every $n^{th}$ pixel, and others select only one pixel to process to determine approximate ambient light levels. Some embodiments of the present invention further process information produced by the light sensor 110 to augment information determined by processing the captured image in determining approximate ambient light levels.

The exemplary embodiment of the present invention iteratively performs the illumination control processing flow 500 in a periodic or aperiodic manner in order to properly determine approximate ambient light levels and adjust device illumination. The exemplary embodiment iterates this process at one second intervals. Some embodiments perform the illumination control processing flow 500 when the flip part 104 is in only one of the open or the closed position, while other embodiments perform the illumination control processing flow 500 when the flip part is in both the open and closed positions. The exemplary embodiment further performs the illumination control processing flow 500 when the flip part 104 is initially closed to determine if the device should be illuminated. This is particularly advantageous for conserving energy since many flip-type devices are configured to remain illuminated for a certain time after the flip part 104 is closed. Not illuminating such a device when ambient light conditions do not require illumination will conserve precious battery energy and prolong battery life.

The embodiments of the present invention described above use a camera that is already incorporated into the wireless device to add picture taking capability desired by consumers to also determine an estimate of ambient light levels. Using the camera to determine estimates of ambient light levels allows the dedicated light sensor used in conventional designs to be removed from the wireless device, so as to reduce the size and cost of the device. The camera can also be used to augment a light sensor. An embodiment of the present invention can augment a light sensor, for example, in a flip-type cellular phone where the light sensor is placed in a location that results in the light sensor being covered when the flip-type cellular phone is closed. In such a case, the camera is exposed to ambient light and can be used to make measurements. In the exemplary embodiment, the camera, which is mounted on the outside of a flip-type cellular phone, is used to determine an estimate of ambient light when the flip-type cellular phone is closed and reduces battery consumption by the cellular phone by disabling the illumination of components on the outside of the cellular phone, such as external displays, when the flip-type cellular phone is closed.

The present invention can be realized in hardware, software, or a combination of hardware and software. A system according to an exemplary embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows a computer to read data, instructions, messages or message packets, and other computer readable information. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A wireless communications device comprising:
   at least one controllable illuminated component;
   at least one camera;
   a flash illumination device;
   a camera controller, communicatively coupled to the at least one camera and the flash illumination device, the camera controller adapted to control the at least one camera to capture at least one image without activation of the flash illumination device;
   an ambient light level calculator, communicatively coupled to the at least one camera, the ambient light level calculator receiving the at least one image from the camera and determining an approximate ambient light level based upon an analysis of the at least one image that was captured without activation of the flash illumination device; and
   an illumination controller, communicatively coupled to the ambient light level calculator and the at least one illuminated component, the illumination controller controlling, in response to the approximate ambient light level, the at least one illuminated component.

2. The device of claim 1, wherein the at least one camera captures a series of images, wherein each image within the series of images is captured at a separate time, and the ambient light level calculator iteratively determines approximate ambient light levels by averaging lighting levels determined by analysis of at least two of the images within the series of images.

3. The device of claim 2, wherein the ambient light level calculator further identifies at least one outlier image within the series of images that has a respective detected ambient light level inconsistent with other images within the series of images, the ambient light level calculator further operating to capture, in response to identifying at least one outlier image, addition images to be included in the series of images.

4. The device of claim 1, further comprising at least one alternate light sensor that also detects approximate ambient light levels.

5. The device of claim 1, further comprising a first flip part and a second flip part, the first flip part being repositionable to a folded position placing the first flip part adjacent to the second flip part, wherein the camera is located on a surface of the first flip part that is exposed to ambient light when in the folded position.

6. The device of claim 5, further comprising further comprising a light sensor, communicatively coupled to the ambient light level calculator, the ambient light level calculator further adapted to detecting approximate ambient light levels based upon output from the light sensor, the light sensor being located on one of the first flip part and the second flip part so as to not be exposed to ambient light when the first flip part is in the folded position, wherein the ambient light level calculator determines the approximate ambient light level based upon the output from the light sensor only when the first flip part is not in the folded position and based only upon the analysis of the at least one image when the first flip part is in the folded position.

7. The device of claim 1, further comprising:
   at least one of an receiver for wirelessly receiving transmitted signals and a transmitter for wirelessly transmitting signals; and
   a baseband processing portion, communicatively coupled to the at least one receiver and transmitter, for processing at least one of data, voice, image and video signals in order to interface with at least one of the receiver and the transmitter.

8. The device of claim 7, further comprising at least one of a microphone and a speaker to facilitate wireless voice communication through the device.

9. The device of claim 1, wherein the analysis comprises:
   selecting a respective subset of pixels within each of the at least one image, wherein the subset of pixels consists of a selection of every $n^{th}$ pixel within the respective image; and
   averaging pixel intensity values for each pixel within the respective subset of pixels to determine the approximate ambient light level.

10. The device of claim 1, wherein the analysis comprises:
    selecting a respective subset of pixels within each of the at least one image, wherein the subset of pixels consists of a random selection of pixels within the respective image; and
    averaging pixel intensity values for each pixel within the respective subset of pixels to determine the approximate ambient light level.

11. The device of claim 1, wherein the analysis comprises:
    selecting a respective portion of each of the at least one image;
    performing a two-dimensional fast Fourier transform for the respective portion of each of the at least one image; and
    averaging a plurality of output bins of the fast Fourier transform to determine the approximate ambient light level.

12. The device of claim 11, wherein the averaging averages all output bins of the fast Fourier transform.

13. A method for controlling an illumination level on a wireless communications device, the method comprising:
    capturing at least one image with at least one camera mounted on an electronic device;
    determining an approximate ambient light level based upon an analysis of a subset of pixels within the at least one image, the subset of pixels consisting of one of every $n^{th}$ pixel within a respective image within the at least one image and a random selection of pixels within the respective image within the at least one image; and controlling, in response to the approximate ambient light level, an illumination level of at least one illuminated component that is located on the electronic device.

14. The method of claim 13, wherein the at least one image comprises a two dimensional image.

15. The method of claim 13, wherein the at least one image comprises a color image.

16. The method of claim 13, wherein the capturing comprises capturing a series of images with each image captured at a separate time, and the determining the approximate ambient light level is by averaging lighting levels determined by analysis of at least two of the images within the series of images.

17. The method of claim 13, further comprising capturing approximate ambient light levels with at least one alternate light sensor.

18. The method of claim 13, wherein the electronic device comprising a first flip part and a second flip part, the first flip part being repositionable to a folded position placing the first flip part adjacent to the second flip part, and wherein the capturing at least one image comprises capturing at least one image with the camera located on a surface of the first flip pad that is exposed to ambient light when in the folded position.

19. The device of claim 18, further comprising further comprising capturing approximate ambient light levels with at least one alternate light sensor that is located on one of the first flip part and the second flip part so as to not be exposed to ambient light when the first flip part is in the folded position, wherein the approximate ambient light level is determined based upon the output from the light sensor only when the first flip part is not in the folded position and is determined based only upon the analysis of the at least one image when the first flip part is in the folded position.

20. A machine readable medium containing a definition of a machine executable method for controlling an illumination level on a wireless communications device, the machine executable method comprising the steps of:

capturing at least one image with at least one camera mounted on an electronic device;

determining an approximate ambient light level based upon an analysis of a subset of pixels within the at least one image, the subset of pixels consisting of one of every $n^{th}$ pixel within a respective image within the at least one image and a random selection of pixels within the respective image within the at least one image; and controlling, in response to the approximate ambient light level, an illumination level of at least one illuminated component that is located on the electronic device.

* * * * *